3,149,030
LOOSE FILL INSULATION MATERIAL
Auguste Louis de Lisle, Phoenix, Ariz., assignor to Phoenix Gems, Inc., a corporation of Arizona
No Drawing. Filed July 30, 1959, Ser. No. 830,472
4 Claims. (Cl. 167—14)

My invention relates to insulation material of a type adapted for loosely filling hollow spaces, as between wall or ceiling joists in buildings. It relates more in particular to a vermin-resisting loose fill insulation material which is non-toxic to warm-blooded life.

The principal object of my invention is the production of an improved loose fill insulation material to which the property of attack and infestation of insect life has been imparted without in any way deleteriously affecting known desirable properties of the insulation.

Such insulation materials as rock wool, slag wool, vesiculated material such as pearlite, cellulose materials like shredded paper, bark, shavings, bagasse, flax or jute fibres, copal, eel grass, processed and unprocessed hair, when installed in accordance with their intended use, frequently provide a way for insect life to enter the so insulated building, and at times may form a living and breeding area for many types of insects. The principal insects found to infect such insulation are dry wood termites, silver fish, roaches, some of the Coleoptera and various Arachnida such as spiders and scorpions. The exact type of infestation to expect is, of course, determined in great part by geographic location and local conditions. This type of problem may be encountered in any case where loose fill insulation is used, regardless of the specific manner of applying the insulation.

Resolving the problem of insect passage through or contamination of loose fill insulation material has not been simple for several reasons. Most important is the necessary relatively low price at which insulation material must be sold. No insect proofing treatment can be used which markedly increases the cost of producing such materials. Because of the manner in which insulation material is used, treatment with substances highly toxic to warm-blooded life is not acceptable. With any insecticidal material used it has always been considered necessary also to combine it some way with the insulation material by solution, surface adsorption or the like; but such manner of use is likely to be effective only on materials which might be ingested by the insects. It would be ineffective on completely inert inorganic substances such as glass wool.

In carrying out my invention the loose insulating material is treated with very finely divided, dry diatomite at a suitable point in its manufacture to coat substantially the entire exposed surface of the insulating material with diatomite dust. While the size of the diatomite particles may vary, it is preferable that in the pretreatment of the diatomite it be ground as finely as possible consistent with the economies involved. When the diatomite is very finely ground, less of it is needed. On the other hand, rather than expend excessive sums of money for very fine, submicron comminution, somewhat more of the product may be used. In general I have found that, using an ordinary available equipment and bag house operation, a dry diatomite product in which 90% of the particles are less than one micron in size may be produced economically. Instead of preparing a highly pure diatomite product, a good grade of diatomaceous earth as mined may be used. If it should contain more than about 8% of total water, it is preferably dried before comminution.

My invention is based on the discovery that finely divided diatomite, as such, is an effective insecticide if the insect can be held in contact with it. In a relatively finely divided loose fill insulation material, the surface of which has diatomite powder adhering to it, the insect will be kept in contact with the diatomite as he moves through it. The manner in which the diatomite affects various types of insects at different stages of their life cycles is explained in my copending application, Serial No. 804,824, filed April 3, 1959, now abandoned, covering the storage of seeds. In insulation materials subject to ingestion by the insect, the action is very similar to that disclosed in connection with seeds. In the case of inert substances such as exfoliated, blown or vesiculated mineral-like substances the insects are killed by contact alone when an untreated diatomite powder is used.

The finely divided loose fill insulation material may be treated with the powdered diatomite at any suitable point in its production, treatment or use. I have found no problem in obtaining adequate adherence of the powdered diatomite to the insulating material surface. Static electrical attraction of the particles to the surface is more than adequate in many instances. In the case of cellulosic and the like materials, surface porosity and irregularity frequently are adequate. When molten inorganic materials are sprayed to vesiculate or fibrillate the same, diatomite powder may be brought into contact with inorganic material and the powder covered to adhere to the surface of the resulting expanded product. The diatomite powder may be sprayed onto the insulating material as it moves on a conveyor through a tunnel, or it may be dropped through a tower into which diatomite powder is sprayed, or contact may be made in many other ways known in the art to bring two materials into intimate contact.

The amount of diatomite used depends on many factors, including the type of insulating material, its specific gravity, available surface, and the like. Since diatomite itself has a relatively low K factor, more than required to produce the desired effect is not objectionable, particularly since the diatomite is not a costly material. I have found that the amount of diatomite used should be determined on a space and surface basis rather than on a weight basis. In general, one or two ounces of dry, very finely divided diatomite should be used for each cubic foot of space occupied by the insulation material; but when the surface and porosity are great, up to five or more ounces per cubic foot may be employed.

In accordance with one manner of practicing my invention, an insulation product comprising shredded waste paper treated with basic acid was intimately mixed with diatomite powder in the proportion of two ounces of diatomite to one cubic foot of the shredded waste paper product. Mixture was accomplished by blowing the diatomite and shredded paper product simultaneously into open spaces between joists in a completed residence building. The insulation material so treated and applied remains free of insects, as contrasted with similar material without diatomaceous earth where insect infestation develops readily.

In another example, exfoliated vermiculite is dusted with powdered diatomite in the proportion of one ounce of diatomite to one cubic foot of vermiculite. The resulting product comprising exfoliated vermiculite, the surface of which is substantially covered with powdered diatomite, is applied in a usual manner as by being poured into an open space from above to fill the same.

In another example, slag is melted and sprayed into the top of a tower to produce a fibrillating action and produce a dark, woolly mass having desirable insulating properties. Coincidentally, dry very finely divided diatomite is sprayed into the top of the tower in the general area of the molten slag spray. The proportions are figured to supply two to three ounces of powdered diatomite to each cubic foot of the resulting slag wool. The slag wool, covered with powdered diatomite, is then formed into batts in accordance with standard practice and the batts are laid between ceiling joists and supported in accordance with standard insulating practice.

My invention may be practiced with any of the commonly available loose fill insulation materials, regardless of the manner of their use. Thus, the insulating material may be of a type which is poured, blown, laid or otherwise introduced into position where it remains in a relatively loose condition as contrasted with insulating material forming a more rigid structure and applied by nailing, cementing, casting and the like. Examples are shredded or otherwise treated cellulosic materials, loose or in the form of batts or the like, expanded or exfoliated minerals such as vermiculite, vesiculated materials such as pearlite, loosely felted materials such as copal, flax, jute or the like fibres, mechanically comminuted materials such as wood chips, bark, inorganic wool-like batts such as fibrillated slag, glass, rock and the like, matted grasses, loosely felted animal hair, and any of the above in loose or in various forms not specifically called out adapted to facilitate certain types of installation.

While the powdered diatomite in general is untreated except for drying and grinding it may be treated, especially when it is used with completely inert materials, to promote ingestion by insects coming in contact with it. I have found that very finely divided diatomite kills on continued contact, but also has a killing action when ingested. I have found that raw whey is suitably usable in this connection. It is sprayed on the diatomite and the resulting product dried, preferably before grinding.

While powdered diatomite is effective without additions, if desired the diatomite powder may be used to adsorb a small proportion of a suitable insect toxicant. Such use may be indicated if the loose fill insulation material is to be introduced into a badly infested building and rapid fumigation effect is desired. In instances when an actual toxicant is used, other powdered carriers such as talc, attapulgite, prophyllite and the like may be used; but such is not in general warranted because of the added cost, the fleeting action of "safe" toxicants, and the fact that only diatomite powder, used as such without additive toxicant, possesses extended effectiveness existing generally, so far as can be determined, substantially for the life of the insulation itself.

I have described my invention in detail so that those skilled in the art will understand the manner of practicing the same; but the scope of the invention is defined by the claims.

I claim:

1. A loose fill insulation material having insecticidal properties comprising an insulating substance in relatively finely subdivided form and presenting a relatively large surface and powdered diatomite substantially covering such surface.

2. A loose fill insulation material as defined in claim 1 wherein a major proportion of the diatomite is less than one micron in size, and wherein the proportion of powdered diatomite is between one and five ounces for each cubic foot which the loose fill insulation material occupies.

3. A loose fill insulation material having insecticidal properties comprising an insulation material of the class consisting of shredded, fibrous and comminuted, naturally-occurring and treated cellulosic material, fibrillated inert inorganic materials, and heat expanded inorganic material, all such materials having a relatively large surface, and powdered diatomite overlaying a relatively large proportion of such surface.

4. The method of improving loose fill, relatively large surface insulating materials which comprises contacting said materials with powdered diatomite to substantially cover said surface with the diatomite powder, whereby to inhibit infestation of said insulating material with insects.

References Cited in the file of this patent

UNITED STATES PATENTS

| | | |
|---|---|---|
| 2,177,197 | Cummins | Oct. 24, 1939 |
| 2,351,686 | Kohl | June 20, 1944 |
| 2,818,340 | Goddin et al. | Dec. 31, 1957 |

OTHER REFERENCES

Frear: Chem. of Insecticides, Fungicides and Herbicides, 2nd ed., 1948, p. 51.

Watkins et al.: Handbook of Insecticides, Dust Diluents and Carriers, pp. 50–70, pp. 55–58 relied on, 1955.

Evening Star, page B7, October 21, 1958.

Bartlett: J. Eco. Ent., vol. 44, No. 6, pp. 891–895.